March 19, 1929.  E. CUDDIHY  1,705,558
BELT CONVEYER

Filed May 24, 1927  2 Sheets-Sheet 1

INVENTOR:
Edward Cuddihy
BY
ATTORNEYS.

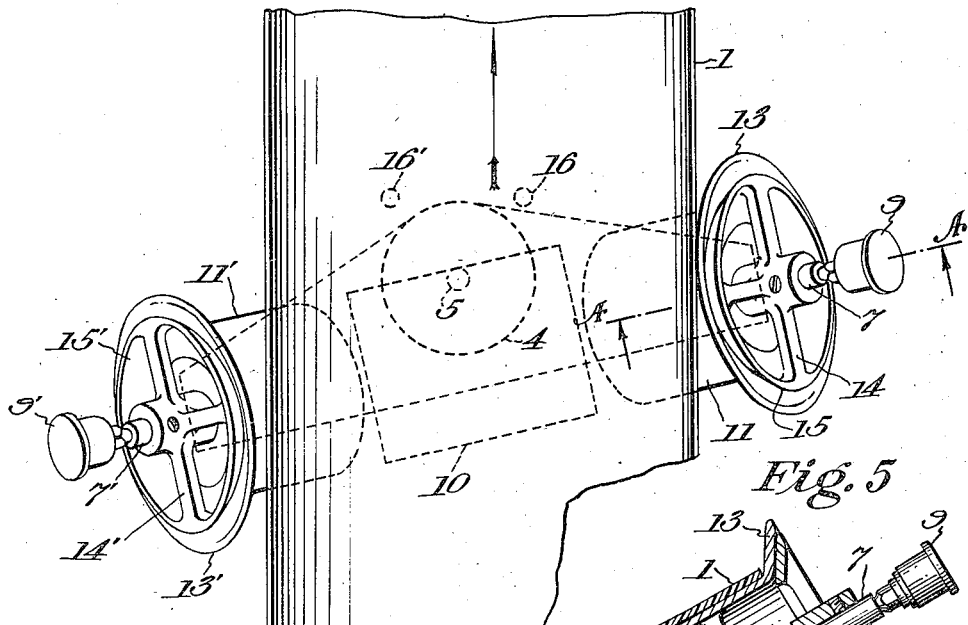
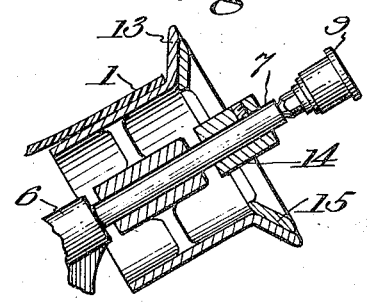
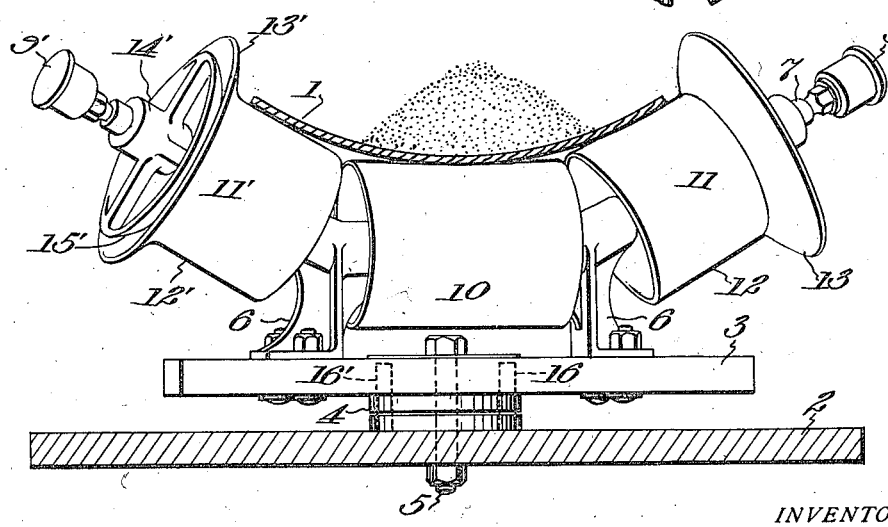

Patented Mar. 19, 1929.

1,705,558

UNITED STATES PATENT OFFICE.

EDWARD CUDDIHY, OF TOOELE, UTAH.

BELT CONVEYER.

Application filed May 24, 1927. Serial No. 193,887.

This invention relates to belt conveyers and more particularly to self-aligning idler rollers for supporting and guiding the conveyer belt.

To increase the carrying capacity of the conveyer it is customary to employ idlers which turn the edges of the belt upwardly, usually from three to seven rollers being employed. These rollers are fixed to the supporting structure of the conveyer at appropriate angles to provide the desired concavity or trough in the belt. Due to unequal loading and other causes, the belts have a considerable tendency to deviate laterally and the established practice is to provide vertically disposed pulleys at the edges of the belt to prevent such lateral movement. These vertical guide pulleys do not remove the tendency toward lateral movement but act as stops which prevent the movement. The pressure of the belt against the pulleys is very destructive to conveyer belts.

An object of the invention is to provide a troughing idler unit which will automatically oppose lateral deviation of the belt. A further object is to provide a troughing idler unit which is so pivoted upon the supporting structure that the lateral thrust occasioned by a shifting of the belt will turn the unit into position to correct the deviation. More specifically, an object is to provide a self-aligning idler which normally functions in accordance with the lateral pressure exerted by the belt upon the unit, and which includes mechanism for increasing the drag at one edge of the belt if the idler does not respond rapidly to an unbalanced lateral pressure.

Figure 1:
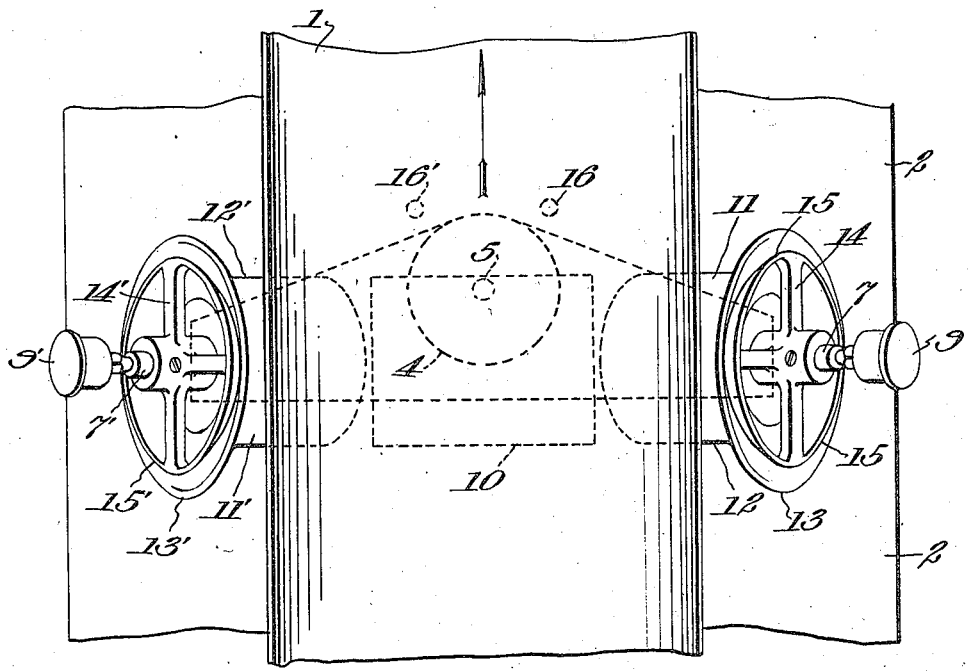
Figure 2:
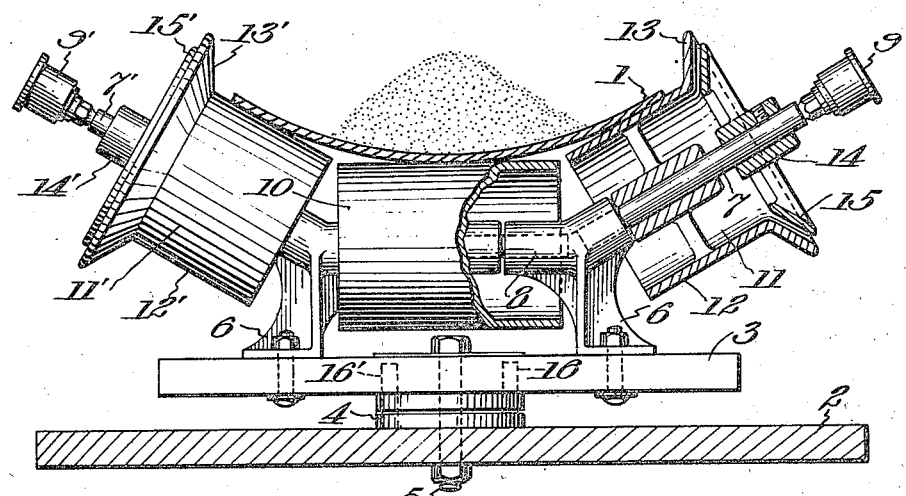

These and other objects of the invention will be apparent from the following specification when taken with the accompanying drawings, in which Fig. 1 is a fragmentary plan view of a belt conveyer and three pulley troughing idlers constructed in accordance with the invention, Fig. 2 is a vertical transverse section through the conveyer, with a portion of the idler pulleys shown in section, Fig. 3 is a fragmentary plan view showing the idlers in position to correct a lateral deviation of the belt, Fig. 4 is a transverse vertical section through the conveyer, the idlers being in the position shown in Fig. 3, and Fig. 5 is a fragmentary vertical section taken on line A—A of Fig. 3.

In the drawings the numeral 1 identifies a conveyer belt carried by a suitable supporting structure 2 and arranged for movement of the loaded section of the belt in the direction indicated by the arrow. The troughing idlers are not mounted directly upon the support 2 but upon a base 3 which rests upon a ball bearing 4, the axis of the bearing being provided by the king or pivot bolt 5. Bearings 6 are mounted on the base 5 to support the oppositely inclined stub shafts 7, $7^1$, and the horizontal stub shaft 8, which shafts are drilled in the usual manner and are provided with grease cups 9, $9^1$, for lubricating the surfaces upon which the idler pulleys rotate. Shaft 8 carries a cylindrical pulley of usual form but the pulleys 11, $11^1$ on shafts 7, $7^1$, respectively, have inner cylindrical portions 12, $12^1$, terminating at flat cones 13, $13^1$, which provide flanges at the outer portions of the respective pulleys. The axes of the cylindrical and conical portions of pulleys 11, $11^1$ lie in the same plane and this plane is arranged, as viewed from the approaching belt, in advance of the pivot 5. The flat cones are so shaped, with respect to the inclination of the stub shafts 7, $7^1$, that the uppermost element of each cone is substantially vertical when the pulleys are installed upon the base.

The stub shafts 7, $7^1$, have fixed thereto spiders 14, $14^1$, carrying brake rings 15, $15^1$, which rings are shaped to conform to the inner surfaces of the respective flanged portions 13, $13^1$ of the inclined pulleys. The brake rings are so spaced that they will not be engaged by the flanges during normal operating conditions.

Stops 16, $16^1$ are provided to limit the angular movement of the idler unit base about the pivot pin 5.

As shown in Figs. 1 and 2, the idler unit for a belt of given width is so designed that the edges of the belt normally clear the side flanges of both inclined idlers, i. e., slight lateral deviations of the belt may occur without bringing the belt into contact with the conical portions 13, $13^1$. Any substantial deviation of the belt will bring the belt into engagement with one of the flanges and the idler unit will then function to correct the deviation. Assuming that the deviation is towards the right, the belt engages the flange 13 of pulley 11 and this side pressure gives rise to a turning moment about the pivot 5 since it is not balanced by any pressure exerted upon the opposite pulley $11^1$. The idler unit will turn counter-clockwise into the position illustrated in Figs. 3 and 4, thus presenting the axis of the pulleys at an angle to a line normal to the path of the travelling belt. The forward movement of the belt will then carry the belt towards the left and correct the deviation.

Except in cases involving a rapid lateral deviation of some magnitude, the brake rings 15, 15¹ take no part in the self-aligning operation of the idler unit as the side pressure upon the conical flanges will be sufficient to shift the unit under normal operating conditions. If, however, the lateral deviation is quite rapid and of considerable magnitude, the inclined idler will move upwardly along its stub shaft to engage the conical flange 13, 13¹ with the corresponding brake ring 15 or 15¹. The frictional resistance will then exert a drag on the belt and the reaction on the pulley will tend to drag the pulley ahead, thus pivoting the unit about the axis 5 and accentuating the angular discrepancy between the roller axes and the normal to the belt. The turning moment is in the same direction as that exerted by the side pressure of the belt and its effect is to hasten the return of the belt to its correct path.

It is to be understood that the invention is not limited to the details of construction herein illustrated and described since various changes may be made in the several parts, their relative size, shape and arrangement without departing from the spirit of my invention as set forth in the following claims:

I claim:

1. A self-aligning troughing idler unit comprising a base, a pair of inclined and oppositely disposed idler pulleys for carrying the opposite edges of a belt, each of said pulleys having the form of a cylinder terminating in an outer conical flange, means on said base supporting said pulleys for rotation about their respective axes, and means pivotally supporting said base for rotation about an axis located beyond the axes of said pulleys.

2. A self-aligning troughing idler unit comprising a base, a plurality of pulleys on said base and with the axes thereof arranged substantially in a single plane, and means supporting said base for pivotal movement about a vertical axis in advance of the plane of said axes, the side pulleys each comprising a cylindrical body portion for the support of the side of the belt and a conical flange flaring outwardly therefrom for engagement by the belt when the latter deviates substantially from its correct position.

3. In a self-aligning troughing idler unit, a pair of oppositely arranged and inclined shafts, troughing rolls on said shafts and terminating in conical flanges, a base for supporting said rolls, means supporting said base for pivotal movement about an axis in advance of said troughing rolls, whereby the pressure of a belt against one of said flanges tends to turn said base about said axis to correct the alignment of the belt, and means for opposing the rotation of either of said rolls where the pressure of the belt moves that roll a predetermined distance along its shaft.

4. In a self-aligning troughing idler unit, a pivotally mounted base, troughing idlers, means actuated by side pressure of a transversely shifted belt for turning said base to correct the belt alignment, and additional means for opposing rotation of one of said idlers to produce a reaction which also tends to correct improper belt alignment.

5. The invention as set forth in claim 4 wherein said additional means is normally inoperative and becomes effective when the lateral displacement of the belt is abnormally rapid.

In testimony whereof, I affix my signature.

EDWARD CUDDIHY.